US008479717B2

(12) United States Patent
Perr et al.

(10) Patent No.: US 8,479,717 B2
(45) Date of Patent: Jul. 9, 2013

(54) THREE-WAY CONTROLLABLE VALVE

(75) Inventors: J. Victor Perr, Greenwood, IN (US); Karen S. Ferguson, North Vernon, IN (US); Gary D. Joyce, Columbus, IN (US); Onkarappa Bolanahalli, Pune (IN)

(73) Assignee: Cummins, Inc., Columbus, IN (US)

( * ) Notice: Subject to any disclaimer, the term of this patent is extended or adjusted under 35 U.S.C. 154(b) by 339 days.

(21) Appl. No.: 12/748,385

(22) Filed: Mar. 27, 2010

(65) Prior Publication Data

US 2011/0232789 A1 Sep. 29, 2011

(51) Int. Cl.
*F02M 25/07* (2006.01)
*F02M 25/06* (2006.01)

(52) U.S. Cl.
USPC .............................. 123/568.24; 123/568.21

(58) Field of Classification Search
USPC .......... 123/568.24, 568.21; 137/595, 625.18, 137/625.19, 625.64, 625.65, 625.21, 625.22, 137/625.23, 625.16, 625.42
See application file for complete search history.

(56) References Cited

U.S. PATENT DOCUMENTS

| | | | |
|---|---|---|---|
| 2,301,041 A | 11/1942 | Hann | |
| 2,728,550 A * | 12/1955 | Sinkler | ........................ 251/317 |
| 2,910,090 A | 10/1959 | Weir | |
| 3,989,025 A | 11/1976 | Franco | |
| 4,134,377 A | 1/1979 | Bamsey et al. | |
| 4,258,687 A | 3/1981 | Mauch et al. | |
| 4,554,943 A | 11/1985 | Claney et al. | |
| 4,905,564 A | 3/1990 | Thayer | |
| 5,046,925 A * | 9/1991 | Fletcher | ........................ 417/138 |
| 5,067,319 A | 11/1991 | Moser | |
| 5,437,304 A * | 8/1995 | Delcroix | ........................ 137/595 |
| 6,647,971 B2 | 11/2003 | Vaughan et al. | |
| 6,726,174 B2 | 4/2004 | Bareis et al. | |
| 7,363,919 B1 | 4/2008 | Styles | |
| 2004/0237926 A1 | 12/2004 | Crall | |
| 2005/0263139 A1 * | 12/2005 | Ryan et al. | .................... 123/478 |
| 2007/0125081 A1 | 6/2007 | Czarnowski et al. | |
| 2007/0144170 A1 | 6/2007 | Griffith | |
| 2009/0211246 A1 | 8/2009 | McEwan et al. | |

FOREIGN PATENT DOCUMENTS

EP 1 426 603 A1 6/2004

OTHER PUBLICATIONS

International Search Report and Written Opinion, ISA/US, PCT/US2011/030112, Cummins Inc., May 17, 2011.

* cited by examiner

*Primary Examiner* — Mahmoud Gimie
(74) *Attorney, Agent, or Firm* — Krieg DeVault LLP

(57) ABSTRACT

A valve system includes a conical valve body disposed in an engine gaseous fluid stream and having a first fluid passageway, where the conical valve body is a cone or a frustum of a cone. The system includes a fluid inlet conduit fluidly coupled to the conical valve body on an upstream side, a first fluid outlet conduit, and a second fluid outlet conduit. The first and second fluid outlet conduits are fluidly coupled to the conical valve body on a downstream side. The valve system includes a valve actuator operatively coupled to the conical valve body and that rotates the conical valve body, and a controller that provides a valve actuator command and thereby selectively flows the engine gaseous fluid stream through the first fluid outlet conduit and the second fluid outlet conduit.

29 Claims, 5 Drawing Sheets

THREE-WAY CONTROLLABLE VALVE

BACKGROUND

The technical field generally relates to three-way valves for gaseous systems, and more specifically but not exclusively relates to three-way valves disposed in engine related gaseous streams. Many presently available three-way valves have drawbacks relating to controllability and flow capacity. For example, presently available valves have a highly non-linear response of flow to valve position, a limited capacity for flow, or both. Therefore, further technological developments are desirable in this area.

SUMMARY

One embodiment is a unique valve system having a conical valve body with increased flow capacity. Other embodiments include the valve system having shaped fluid openings that enhance flow controllability. Further embodiments, forms, objects, features, advantages, aspects, and benefits shall become apparent from the following description and drawings.

DESCRIPTION OF THE ILLUSTRATIVE EMBODIMENTS

Figure 1:
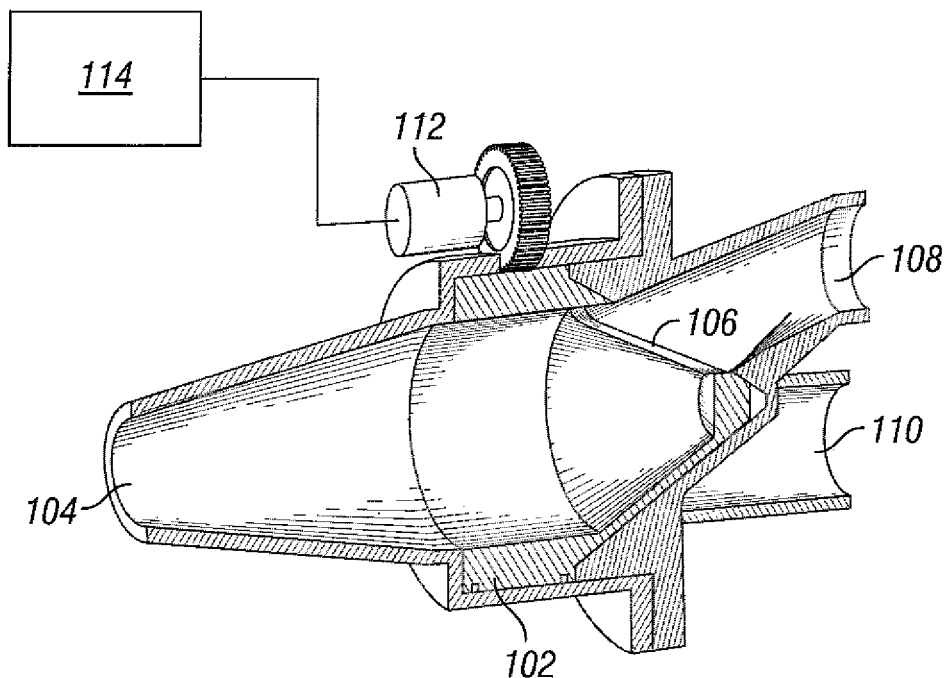
FIG. 1 is an illustrative sectional view of a valve system having a conical valve body.
Figure 2:
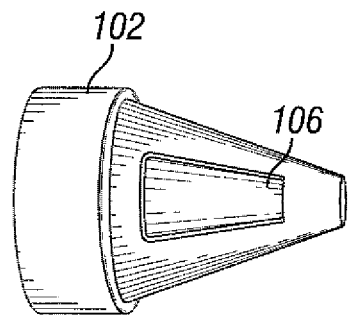
FIG. 2 is a side view of an exemplary conical valve body.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is an illustrative sectional view of one embodiment of a valve system having a conical valve body 102. The conical valve body 102 is a cone or a portion of a cone including at least a frustum of a cone. The conical valve body 102 is disposed in an engine gaseous fluid stream and has a first fluid passageway 106. The valve system includes a fluid inlet conduit 104 fluidly coupled to the conical valve body 102 on an upstream side, a first fluid outlet conduit 108 and a second fluid outlet conduit 110, where the fluid outlet conduits 108, 110 are fluidly coupled to the conical valve body 102 on a downstream side. The first fluid passageway 106 selectively allows flow of the engine gaseous fluid stream to pass from the fluid inlet conduit 104 to the first fluid outlet conduit 108 and/or to the second fluid outlet conduit 110, depending upon the rotational position of the conical valve body 102.

Figure 6:
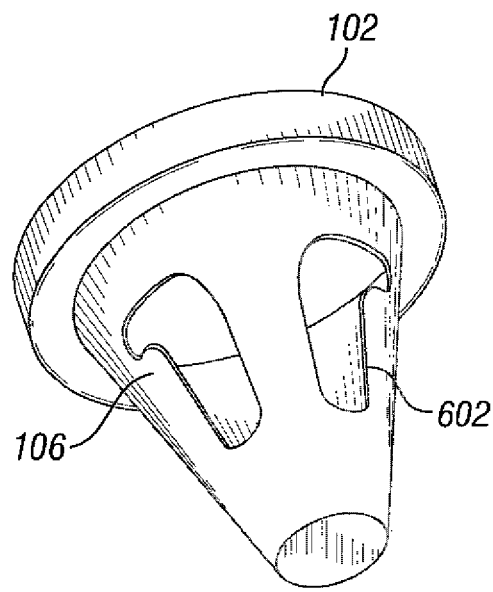
FIG. 6 is a perspective view of another exemplary conical valve body.

The conical valve body 102 may utilize the first fluid passageway 106 to connect to both of the fluid outlet conduits 108, 110, or in certain embodiments, the conical valve body 102 may include a second fluid passageway, where the first fluid passageway 106 selectively connects to the first fluid outlet conduit 108 and the second fluid passageway selectively connects to the second fluid conduit 110. For example, referencing FIG. 6, a first fluid passageway 106 connects the fluid inlet conduit 104 to the first fluid outlet conduit 108 when the conical valve body 102 is rotated in a first direction (e.g. clockwise in the example of FIG. 6), and a second fluid passageway 602 connects the fluid inlet conduit 104 to the second fluid outlet conduit 110 when the conical valve body 102 rotates in a second direction (e.g. counter-clockwise in the example of FIG. 6).

The valve system includes a valve actuator 112 operatively coupled to the conical valve body 102 that rotates the conical valve body 102. The actuator 112 in the illustration of FIG. 1 is an electric motor having a gear that engages an outer geared rim of the conical valve body 102, minimizing a rotational torque required to turn the conical valve body 102. However, any actuation scheme understood in the art is contemplated herein, including at least electrical, pneumatic, and/or hydraulic actuators. In certain embodiments, the valve system further includes a controller 114 that provides a valve actuator command and thereby selectively flows the engine gaseous fluid stream through the first fluid outlet conduit 108 and the second fluid outlet conduit 110. Selectively flowing through the first fluid outlet conduit 108 and the second fluid outlet conduit 110 includes flowing through one of the fluid outlet conduits 108, 110, through both of the fluid outlet conduits 108, 110 simultaneously, and/or closing the conical valve body 102 to prevent flow through either of the fluid outlet conduits 108, 110.

In certain embodiments, the valve actuator command is a first fluid outlet command, a second fluid outlet command, and/or a valve closed command. The first fluid outlet command is a conical valve body 102 position corresponding to an amount of flow from the fluid inlet conduit 104 to the first fluid outlet conduit 108. The second fluid outlet command is a conical valve body 102 position corresponding to an amount of flow from the fluid inlet conduit 104 to the second fluid outlet conduit 110. The valve closed command is a conical valve body 102 position corresponding to not allowing flow from the fluid inlet conduit 104 to either of the fluid outlet conduits 108, 110. The valve actuator command may be a transition command (e.g. a command that is an intermediate position traversed before a final position achieving the desired flow), a filtered command (e.g. a command value that has a low-pass filter or smoothing procedure applied), and/or may be a command that is based on a desired exposed flow area between the inlet fluid conduit 104 and the fluid outlet conduits 108, 110 rather than based on a desired flow rate.

Figure 3:
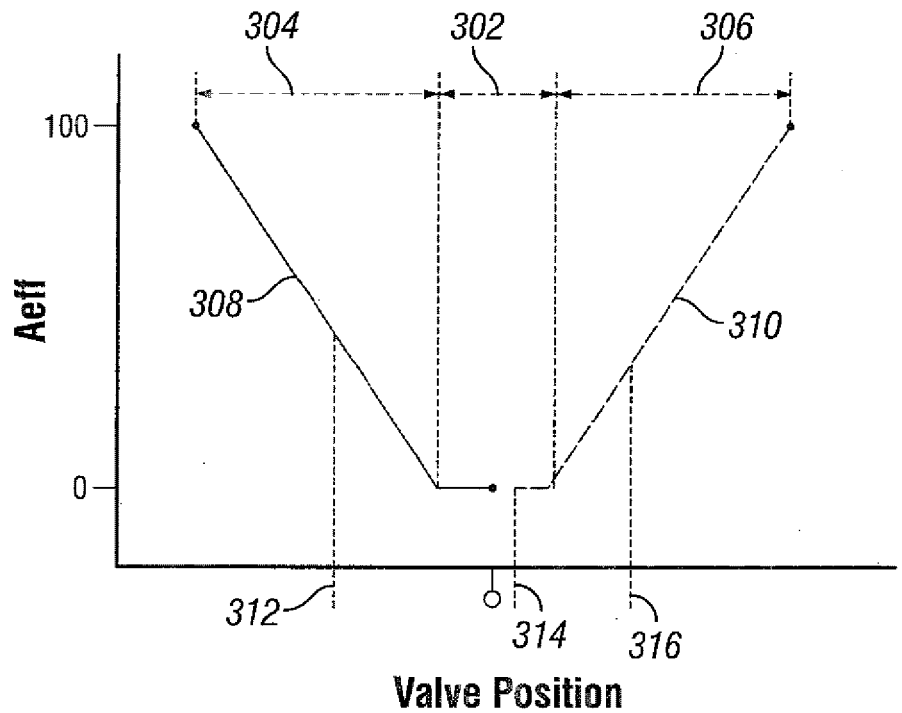
FIG. 3 is an illustration of an effective area versus valve position.

In certain embodiments, the first fluid passageway 106 connects to only the first fluid outlet conduit 108 at a first conical valve position, to only the second fluid outlet conduit 110 at a second conical valve position, and to neither fluid outlet conduit at a third conical valve position. For example, referencing FIG. 3, a first effective flow area curve 308 and a second effective flow area curve 310 describe an effective flow area between the fluid inlet conduit 104 and the first fluid outlet conduit 108 (for the first curve 308) and the second fluid outlet conduit 110 (for the second curve 310). In the example of FIG. 3, a first conical valve position 312 connects the fluid inlet conduit 104 to the first fluid outlet conduit 108, and a second conical valve position 316 connects the fluid inlet conduit 104 to the second fluid outlet conduit 110. In the example of FIG. 3, the first fluid passageway 106 may connect both the first and second fluid outlet conduits 108, 110, or a second fluid passageway 602 (FIG. 6) may be utilized to connect the second fluid outlet conduit 110. In the example of FIG. 3, the first fluid outlet conduit 108 is connected to the fluid inlet conduit 104 in a first range 304 of conical valve body 102 positions, the second fluid outlet conduit 110 is connected to the fluid inlet conduit 104 in a second range 306 of conical valve body 102 positions, and neither fluid outlet conduit 108, 110 is connected to the fluid inlet conduit 104 in a closed range 302 of conical valve body 102 positions.

Figure 4:
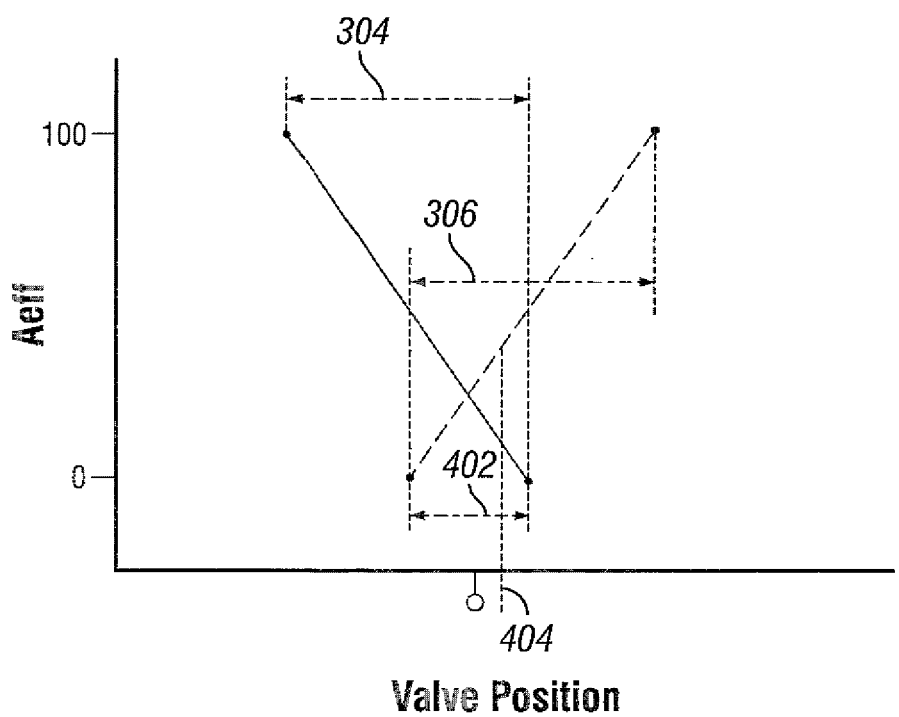
FIG. 4 is an illustration of another effective area versus valve position.
Figure 5:
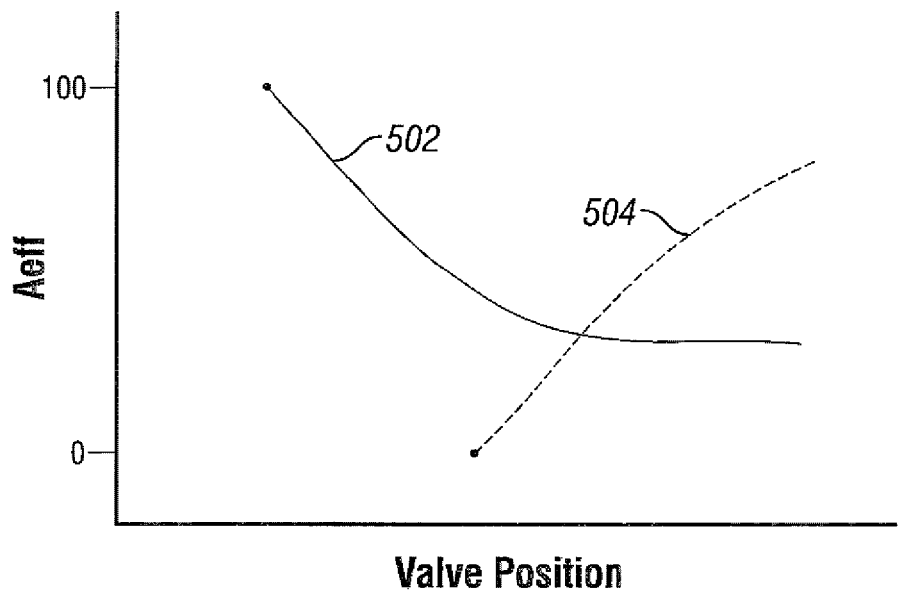
FIG. 5 is an illustration of another effective area versus valve position.
Figure 7:
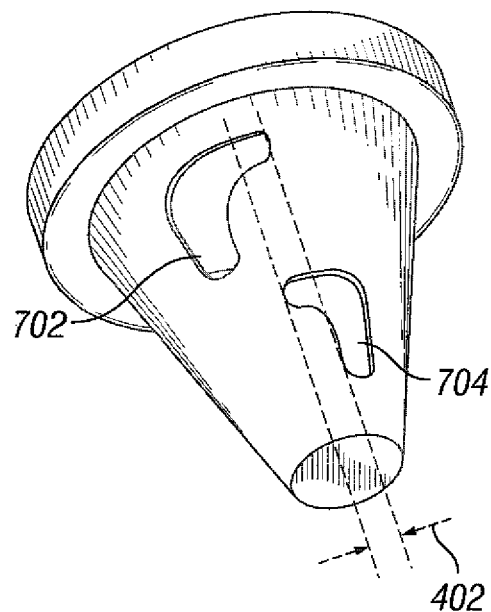
FIG. 7 is a perspective view of another exemplary conical valve body.
Figure 8:
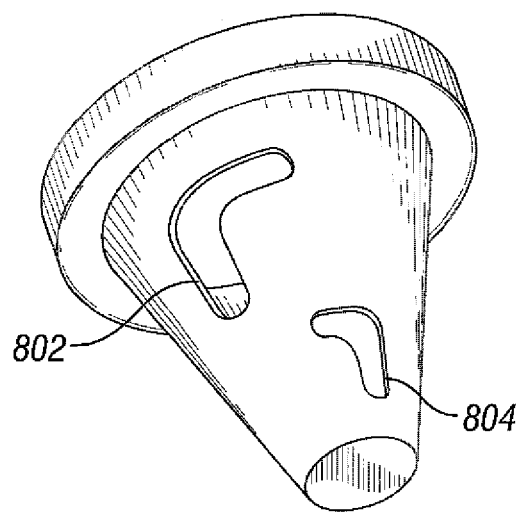
FIG. 8 is a perspective view of another exemplary conical valve body.

In a further embodiment, the first fluid passageway 106 connects to both the first fluid outlet conduit 108 and the second fluid outlet conduit 110 at a fourth conical valve position. Referencing FIG. 4, at a fourth conical valve position 404, both the first fluid outlet conduit 108 and the second fluid outlet conduit 110 have an effective flow area connecting to the fluid inlet conduit 104. The fluid outlet conduits 108, 110 may connect to the fluid inlet conduit 104 through a single fluid passageway (e.g. the first fluid passageway 106 connects to both fluid outlet conduits 108, 110) or through separate fluid passageways (e.g. the first fluid passageway 106 connects to the first fluid outlet conduit 108 and a second fluid passageway 602 connects to the second fluid outlet conduit 110). Referencing FIG. 7, a first exemplary fluid passageway 702 and a second exemplary fluid passageway 704 are structured to connect the fluid inlet conduit 104 to separate fluid outlet conduits 108, 110. The first and second exemplary fluid passageways 702, 704 have a radial overlap range 402 where both fluid outlet conduits 108, 110 are connected. The exemplary fluid passageways 702, 704 are consistent with an embodiment yielding effective flow areas versus conical valve positions illustrated in FIG. 4.

In certain embodiments, the first fluid passageway 106 is shaped such that a rate of change in a first flow area through the first fluid passageway 106 into the first fluid outlet conduit 108 is increasing as the first flow area increases for low values of the first flow area. For example, referencing FIG. 6, it is seen that as the conical valve body 102 rotates to expose the first fluid passageway 106 into the first fluid outlet conduit 108 with an increasing first flow area at low values of the first flow area. The use of an increasing rate of change of the flow area allows an effective flow area versus conical valve body 102 rotational position that is more nearly linear and therefore more readily controllable. The first fluid passageway 106 may be structured to provide an effective flow area versus rotational position that is linear, that is nearly linear, or that is linear at some range of rotational angles. In certain embodiments, the use of increasing rate of change of the flow area occurs for low values of the first flow area including: values of the first flow area below about 30% of the total area of the first fluid passageway 106, values through a flow area of interest, and values through an effective flow area of about 50% of the total effective flow area.

The desired amount of linearization is dependent upon the application, including which engine streams the valve is controlling and the desired amount of control of those streams. For example, where the first fluid outlet conduit is an exhaust stream and where the second fluid outlet conduit is an EGR stream, the desired controllability of the EGR stream may be high at low EGR stream flow rates to address emissions compliance, while the desired controllability of the exhaust flow stream may be lower as the bulk of the flow passes to the exhaust stream at most operating points. The sensitivity of the application to controllability and the relative flow rates of the outlet streams at various operating conditions are understood to one of skill in the art having the benefit of the disclosures herein.

Figure 11:
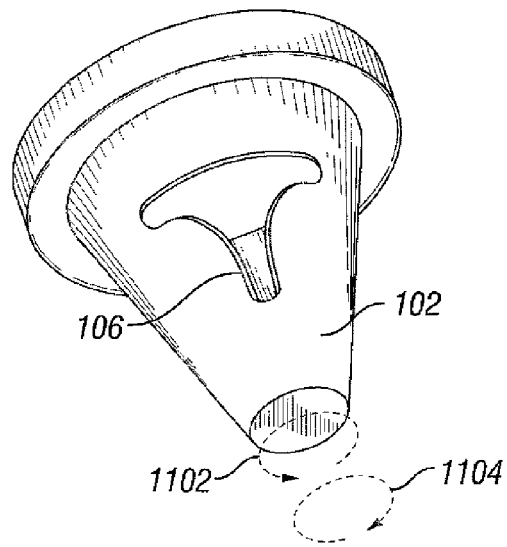
FIG. 11 is a perspective view of another exemplary conical valve body.

In certain embodiments, the first fluid passageway 106 and/or the second fluid passageway 602 are shaped such that a rate of change in a second flow area through the first fluid passageway into the second fluid outlet conduit is increasing as the second flow area increases for low values of the second flow area. In a further embodiment, the first fluid passageway 106 is shaped such that a rate of change in an effective first flow area through the first fluid passageway into the first fluid outlet conduit is approximately linear as the first flow area increases for low values of the first flow area. The first fluid passageway 106 may be shaped such that flow into the first fluid outlet conduit 108 and into the second fluid outlet conduit 110 are both at least partially linearized. Referencing FIG. 11, the first fluid passageway 106 introduces flow from the fluid inlet conduit 104 into the first fluid outlet conduit 108 as the conical valve body 102 rotates in a first direction 1104, and introduces flow from the fluid inlet conduit 104 into the second fluid outlet conduit 110 as the conical valve body 102 rotates in the second direction 1102. The first fluid passageway 106 at least partially linearizes the effective flow area through the first fluid passageway 106 at low values of the flow area into each of the first and second fluid outlet conduits 108, 110.

Referencing FIG. 3, in an exemplary embodiment the conical valve body includes a first fluid passageway and a second fluid passageway. The first fluid passageway connects to the first fluid outlet conduit at a first range of conical valve positions 304, and the second fluid passageway connects to the second fluid outlet conduit at a second range of conical valve positions 306. The valve system is closed at a closed range of conical valve positions 302. In certain embodiments, for example referencing FIG. 4, the first range of conical valve positions 304 and the second range of conical valve positions 306 include an overlap range 402.

Figure 9:
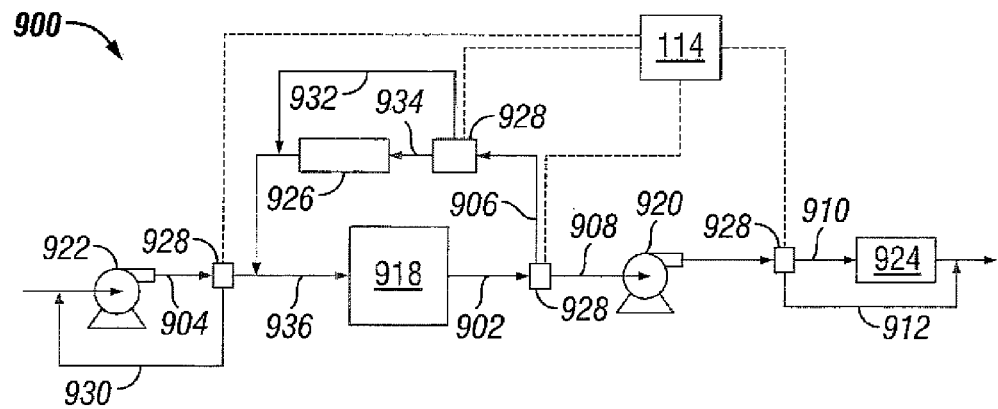
FIG. 9 is a schematic diagram of a system.

Referencing FIG. 9, an exemplary system 900 including an internal combustion engine 918 providing a gaseous fluid stream. The system 900 includes one or more valve systems 928, each valve system 928 having a conical valve body including at least a frustum of a cone, where the conical valve body disposed in the gaseous fluid stream and having a first fluid passageway. Each valve system 928 further includes a fluid inlet conduit fluidly coupled to the conical valve body on an upstream side, a first fluid outlet conduit and a second fluid outlet conduit, where the fluid outlet conduits are fluidly coupled to the conical valve body on a downstream side. Each valve system 928 further includes a valve actuator operatively coupled to the conical valve body and that rotates the conical valve body, and a controller 114 that provides a valve actuator command and thereby selectively flows the engine gaseous fluid stream through the first fluid outlet conduit and the second fluid outlet conduit.

The system 900 includes a number of valve systems 928 included in exemplary locations. One gaseous fluid stream is an engine exhaust stream 902, with the first fluid outlet conduit being an EGR stream 906, and the second fluid outlet conduit being a turbine inlet stream 908. Another gaseous fluid stream is an engine exhaust stream 902 that may be coming from a turbine 920, with the first fluid outlet conduit being an aftertreatment component inlet stream 910 that flows through an aftertreatment component 924, and the second fluid outlet conduit being an aftertreatment component bypass stream 912. Another gaseous fluid stream is an EGR stream 906, with the first fluid outlet conduit being an EGR cooler stream 934 entering an EGR cooler 926, and the second fluid outlet conduit including an EGR bypass stream 932. Another gaseous fluid stream is a compressor outlet stream 904 exiting a compressor 922, with the first fluid outlet conduit being an engine intake stream 936, and the second fluid outlet conduit being a compressor bypass stream 930 that recirculates to a compressor intake or vents to atmosphere (not shown).

Figure 10:
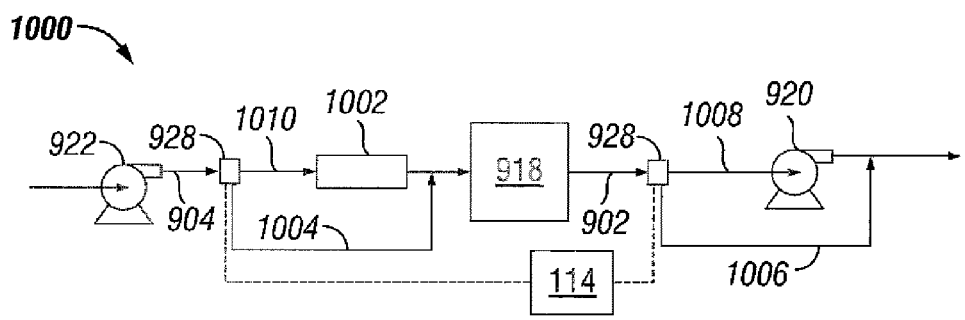
FIG. 10 is a schematic diagram of another system.

Referencing FIG. 10, a system 1000 includes a number of valve systems 928 in exemplary locations. A gaseous fluid stream is an engine exhaust stream 902, with the first fluid outlet conduit being a turbine inlet stream 1008 that flows into a turbine 920 and the second fluid outlet conduit being a turbine bypass stream 1006. Another gaseous fluid stream is a compressor outlet stream 904 that exits a compressor 922, with the first fluid outlet conduit being an inter-cooler stream 1010 that flows through an inter-cooler 1002, and the second fluid outlet conduit being an inter-cooler bypass stream 1004.

Yet another exemplary embodiment is a system including a fluid inlet conduit having a fluid stream therein, the fluid inlet conduit fluidly coupled to a single conical valve body means for selectively dividing the fluid stream between a first fluid outlet conduit and a second fluid outlet conduit. The single conical valve body means includes a valve body comprising an at least partial cone including the frustum of a cone. The conical valve body means includes at least one orifice that connects to the first fluid outlet conduit, the second fluid outlet conduit, both the first fluid outlet conduit, and/or neither of the first or second fluid outlet conduit depending upon the rotational position of the valve body means. The orifice(s) may be shaped such that an effective flow area through the orifice from the fluid inlet conduit into the first fluid outlet conduit or the second fluid outlet conduit comprises a controllable function. The controllable function includes an at least partially linearized function, for example the orifice may be shaped to provide an increasing rate of change of orifice area into the first or second fluid outlet conduit for rotational positions of the conical valve body means associated with a low orifice area. In certain embodiments, the valve body means includes a first orifice that connects to the first fluid outlet conduit, and a second orifice that connects to the second fluid outlet conduit.

An exemplary valve body means includes connecting with the first fluid outlet conduit when the conical valve body is rotated in a first direction, and connecting with the second fluid outlet conduit when the conical valve body is rotated in a second direction. Another exemplary valve body means includes connecting with the first fluid outlet conduit when the conical valve body is rotated in the first direction, and connecting with the second fluid outlet conduit when the conical valve body means is rotated still further in the first direction. An exemplary valve body means includes a first orifice structured to continuously connect the fluid inlet conduit to the first fluid outlet conduit, where rotation of the conical valve body selectively connects the first orifice or a second orifice to a second fluid outlet conduit, and/or rotation of the conical valve body varies an effective area of connection to the first fluid outlet conduit and/or the second fluid outlet conduit. The effective flow area includes a flow permittivity from the fluid inlet conduit to the respective fluid outlet conduit (e.g. the first fluid outlet conduit and/or the second fluid outlet conduit) through the single conical valve body means.

As is evident from the figures and text presented above, a variety of embodiments according to the present invention are contemplated.

One exemplary embodiment is a valve system, including a conical valve body having at least a frustum of a cone, the conical valve body disposed in an engine gaseous fluid stream and having a first fluid passageway. The system further includes a fluid inlet conduit fluidly coupled to the conical valve body on an upstream side, and a first fluid outlet conduit and a second fluid outlet conduit, where the fluid outlet conduits are fluidly coupled to the conical valve body on a downstream side. The system includes a valve actuator operatively coupled to the conical valve body and structured to rotate the conical valve body, and a controller structured to provide a valve actuator command and thereby selectively flow the engine gaseous fluid stream through the first fluid outlet conduit and the second fluid outlet conduit.

Certain embodiments of the system include one or more of the features following. The system includes the valve actuator command being a first fluid outlet command, a second fluid outlet command, and/or a valve closed command. In certain embodiments, the first fluid passageway connects to only the first fluid outlet conduit at a first conical valve position, to only the second fluid outlet conduit at a second conical valve position, and to neither fluid outlet conduit at a third conical valve position. In a further embodiment, the first fluid passageway connects to both the first fluid outlet conduit and the second fluid outlet conduit at a fourth conical valve position. In certain embodiments, the first fluid passageway is shaped such that a rate of change in a first flow area through the first fluid passageway into the first fluid outlet conduit is increasing as the first flow area increases for low values of the first flow area, and/or shaped such that a rate of change in a second flow area through the first fluid passageway into the second fluid outlet conduit is increasing as the second flow area increases for low values of the second flow area. In a further embodiment, the first fluid passageway is shaped such that a rate of change in an effective first flow area through the first fluid passageway into the first fluid outlet conduit is approximately linear as the first flow area increases for low values of the first flow area.

In certain embodiments, the conical valve body further includes a second fluid passageway. The first fluid passageway connects to the first fluid outlet conduit at a first range of conical valve positions, and the second fluid passageway connects to the second fluid outlet conduit at a second range of conical valve positions. The valve system is closed at a closed range of conical valve positions. The first range of conical valve positions and the second range of conical valve positions include an overlap range.

Another exemplary embodiment is a system including an internal combustion engine providing a gaseous fluid stream, and a conical valve body including at least a frustum of a cone, where the conical valve body disposed in the gaseous fluid stream and having a first fluid passageway. The system further includes a fluid inlet conduit fluidly coupled to the conical valve body on an upstream side, a first fluid outlet conduit and a second fluid outlet conduit, where the fluid outlet conduits are fluidly coupled to the conical valve body on a downstream side. The system further includes a valve actuator operatively coupled to the conical valve body and that rotates the conical valve body, and a controller that provides a valve actuator command and thereby selectively flow the engine gaseous fluid stream through the first fluid outlet conduit and the second fluid outlet conduit. In certain embodiments, the gaseous fluid stream includes an engine exhaust stream, an exhaust gas recirculation (EGR) stream, and/or a compressor outlet stream.

An embodiment of the system includes the gaseous fluid stream being an engine exhaust stream, the first fluid outlet conduit including an EGR stream, and the second fluid outlet conduit including a turbine inlet stream. Another embodiment of the system includes the gaseous fluid stream being an engine exhaust stream, the first fluid outlet conduit including an aftertreatment component inlet stream, and the second fluid outlet conduit including an aftertreatment component bypass stream. Another embodiment of the system includes the gaseous fluid stream being an engine exhaust stream, the first fluid outlet conduit including a turbine inlet stream and the second fluid outlet conduit including a turbine bypass stream. Another embodiment of the system includes the gaseous fluid stream being an EGR stream, the first fluid outlet conduit including an EGR cooler stream, and the second fluid outlet conduit including an EGR bypass stream. Another embodiment of the system includes the gaseous fluid stream being a compressor outlet stream, the first fluid outlet conduit including an inter-cooler stream, and the second fluid outlet conduit including an inter-cooler bypass stream. Another embodiment of the system includes the gaseous fluid stream being a compressor outlet stream, the first fluid outlet conduit including an engine intake stream, and the second fluid outlet conduit including a compressor bypass stream.

In certain embodiments, the first fluid passageway connects to only the first fluid outlet conduit at a first conical valve position, connects to only the second fluid outlet conduit at a second conical valve position, and connect to neither fluid outlet conduit at a third conical valve position. The first fluid passageway may connect to both the first fluid outlet conduit and the second fluid outlet conduit at a fourth conical valve position.

In certain embodiments, the first fluid passageway is shaped such that a rate of change in a first flow area through the first fluid passageway into the first fluid outlet conduit is increasing as the first flow area increases for low values of the first flow area. The first fluid passageway may be shaped such that a rate of change in a second flow area through the first fluid passageway into the second fluid outlet conduit is increasing as the second flow area increases for low values of the second flow area. In further embodiments, the first fluid passageway may be shaped such that a rate of change in an effective first flow area through the first fluid passageway into the first fluid outlet conduit is approximately linear as the first flow area increases for low values of the first flow area.

In certain embodiments, the conical valve body further includes a second fluid passageway. The first fluid passageway connects to the first fluid outlet conduit at a first range of conical valve positions, and the second fluid passageway connects to the second fluid outlet conduit at a second range of conical valve positions. The valve system may be closed at a closed range of conical valve positions. In certain embodiments, the first range of conical valve positions and the second range of conical valve positions include an overlap range.

Yet another exemplary embodiment is a system including a fluid inlet conduit having a fluid stream therein, the fluid inlet conduit fluidly coupled to a single conical valve body means for selectively dividing the fluid stream between a first fluid outlet conduit and a second fluid outlet conduit, wherein the first fluid outlet conduit and the second fluid outlet conduit are fluidly coupled to the single conical valve body means. The system further includes a first flow control means for at least partially linearizing a function of a first effective flow area versus a position of the single conical valve body means position, where the first effective flow area includes a flow permittivity from the fluid inlet conduit to the first fluid outlet conduit through the single conical valve body means. The system may further include a second flow control means for at least partially linearizing a function of a second effective flow area versus a position of the single conical valve body means position, where the second effective flow area includes a flow permittivity from the fluid inlet conduit to the second fluid outlet conduit through the single conical valve body means.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A valve system, comprising:
    a conical valve body including a frustum of a cone and a first fluid passageway;
    a fluid inlet conduit fluidly coupled to the conical valve body on an upstream side;
    a first fluid outlet conduit and a second fluid outlet conduit fluidly coupled to the conical valve body on a downstream side;
    wherein the first fluid passageway is structured to connect to the first fluid outlet conduit at a first conical valve position, and to connect to the second fluid outlet conduit at a second conical valve position;
    a valve actuator operatively coupled to the conical valve body and structured to rotate the conical valve body; and
    a controller structured to provide a valve actuator command and thereby selectively allow the flow of an internal combustion engine gaseous fluid stream through the fluid conduits.

2. The system of claim 1, wherein the valve actuator command comprises at least one command selected from the commands consisting of: a first fluid outlet command, a second fluid outlet command, and a valve closed command.

3. The system of claim 1, wherein the first fluid passageway is structured to connect to only the first fluid outlet conduit at the first conical valve position, to connect to only the second fluid outlet conduit at the second conical valve position, and to connect to neither fluid outlet conduit at a third conical valve position.

4. The system of claim 3, wherein the first fluid passageway is further structured to connect to both the first fluid outlet conduit and the second fluid outlet conduit at a fourth conical valve position.

5. The system of claim 1, wherein the first fluid passageway is shaped such that a rate of change in a first flow area through the first fluid passageway into the first fluid outlet conduit is increasing as the first flow area increases for low values of the first flow area.

6. The system of claim 5, wherein the first fluid passageway is shaped such that a rate of change in a second flow area through the first fluid passageway into the second fluid outlet conduit is increasing as the second flow area increases for low values of the second flow area.

7. The system of claim 5, wherein the first fluid passageway is shaped such that a rate of change in an effective first flow area through the first fluid passageway into the first fluid outlet conduit is approximately linear as the first flow area increases for low values of the first flow area.

8. The system of claim 1, wherein the conical valve body further comprises a second fluid passageway.

9. The system of claim 8, wherein the first fluid passageway connects to the first fluid outlet conduit at a first range of conical valve positions, and wherein the second fluid passageway connects to the second fluid outlet conduit at a second range of conical valve positions.

10. The system of claim 9, wherein the first range of conical valve positions and the second range of conical valve positions comprise an overlap range.

11. A system, comprising:
an internal combustion engine being operable to produce a gaseous fluid stream;
a conical valve body comprising at least a frustum of a cone, the conical valve body disposed in the gaseous fluid stream and having a first fluid passageway;
a fluid inlet conduit fluidly coupled to the conical valve body on an upstream side;
a first fluid outlet conduit and a second fluid outlet conduit, the fluid outlet conduits fluidly coupled to the conical valve body on a downstream side;
wherein the first fluid passageway is structured to connect to the first fluid outlet conduit at a first conical valve position, and to connect to the second fluid outlet conduit at a second conical valve position; and
a valve actuator operatively coupled to the conical valve body and structured to rotate the conical valve body.

12. The system of claim 11, further comprising a controller structured to provide a valve actuator command to selectively flow the engine gaseous fluid stream through the first fluid outlet conduit and the second fluid outlet conduit.

13. The system of claim 11, wherein the gaseous fluid stream comprises a stream selected from the streams consisting of: an engine exhaust stream, an exhaust gas recirculation (EGR) stream, and a compressor outlet stream.

14. The system of claim 11, wherein the gaseous fluid stream comprises an engine exhaust stream, wherein the first fluid outlet conduit receives an EGR stream and wherein the second fluid outlet conduit receives a turbine inlet stream.

15. The system of claim 11, wherein the gaseous fluid stream comprises an engine exhaust stream, wherein the first fluid outlet conduit receives an aftertreatment component inlet stream and wherein the second fluid outlet conduit receives an aftertreatment component bypass stream.

16. The system of claim 11, wherein the gaseous fluid stream comprises an engine exhaust stream, wherein the first fluid outlet conduit receives a turbine inlet stream and wherein the second fluid outlet conduit receives a turbine bypass stream.

17. The system of claim 11, wherein the gaseous fluid stream comprises an EGR stream wherein the first fluid outlet conduit receives an EGR cooler stream and wherein the second fluid outlet conduit receives an EGR bypass stream.

18. The system of claim 11, wherein the gaseous fluid stream comprises a compressor outlet stream, wherein the first fluid outlet conduit comprises an inter-cooler stream and wherein the second fluid outlet conduit comprises an inter-cooler bypass stream.

19. The system of claim 11, wherein the gaseous fluid stream comprises a compressor outlet stream, wherein the first fluid outlet conduit receives an engine intake stream and wherein the second fluid outlet conduit receives a compressor bypass stream.

20. The system of claim 11, wherein the first fluid passageway is structured to connect to only the first fluid outlet conduit at the first conical valve position, to connect to only the second fluid outlet conduit at the second conical valve position, and to connect to neither fluid outlet conduit at a third conical valve position.

21. The system of claim 20, wherein the first fluid passageway is structured to connect to both the first fluid outlet conduit and the second fluid outlet conduit at a fourth conical valve position.

22. The system of claim 12, wherein the first fluid passageway is shaped such that a rate of change in a first flow area through the first fluid passageway into the first fluid outlet conduit is increasing as the first flow area increases for low values of the first flow area.

23. The system of claim 22, wherein the first fluid passageway is shaped such that a rate of change in a second flow area through the first fluid passageway into the second fluid outlet conduit is increasing as the second flow area increases for low values of the second flow area.

24. The system of claim 22, wherein the first fluid passageway is shaped such that a rate of change in an effective first flow area through the first fluid passageway into the first fluid outlet conduit is approximately linear as the first flow area increases for low values of the first flow area.

25. The system of claim 11, wherein the conical valve body further comprises a second fluid passageway.

26. The system of claim 25, wherein the first fluid passageway connects to the first fluid outlet conduit at a first range of conical valve positions, wherein the second fluid passageway connects to the second fluid outlet conduit at a second range of conical valve positions.

27. The system of claim 26, wherein the first range of conical valve positions and the second range of conical valve positions comprise an overlap range.

28. A system, comprising:
a fluid inlet conduit having a fluid stream therein, the fluid inlet conduit fluidly coupled to a single conical valve body means for selectively dividing the fluid stream between a first fluid outlet conduit and a second fluid outlet conduit, wherein the first fluid outlet conduit and the second fluid outlet conduit are fluidly coupled to the single conical valve body means; and
a first flow control means for linearizing a function of a first effective flow area versus a position of the single conical valve body means position, wherein the first effective flow area comprises a flow permittivity from the fluid inlet conduit to the first fluid outlet conduit through the single conical valve body means.

29. The system of claim 28, further comprising a second flow control means for linearizing a function of a second effective flow area versus a position of the single conical valve body means position, wherein the second effective flow area comprises a flow permittivity from the fluid inlet conduit to the second fluid outlet conduit through the single conical valve body means.

* * * * *